(12) United States Patent
Lind (10) Patent No.: US 11,280,513 B2
(45) Date of Patent: Mar. 22, 2022

(54) ARRANGEMENT AND METHOD FOR DETERMINATION OF ADJUSTMENT PARAMETERS OF AN HVAC SYSTEM

(71) Applicant: Ilmastointimittaus Lind Oy, Helsinki (FI)

(72) Inventor: Lars-Eric Axel Lind, Helsinki (FI)

(73) Assignee: Ilmastointimittaus Lind Oy, Helsinki (FI)

(*) Notice: Subject to any disclaimer, the term of this patent is extended or adjusted under 35 U.S.C. 154(b) by 236 days.

(21) Appl. No.: 16/635,569

(22) PCT Filed: Jul. 27, 2018

(86) PCT No.: PCT/FI2018/050560
§ 371 (c)(1),
(2) Date: Jan. 31, 2020

(87) PCT Pub. No.: WO2019/025662
PCT Pub. Date: Feb. 7, 2019

(65) Prior Publication Data
US 2020/0240667 A1    Jul. 30, 2020

(30) Foreign Application Priority Data

Jul. 31, 2017 (FI) ........................................ 20175706
Jul. 27, 2018 (FI) ........................................ 20185660

(51) Int. Cl.
*F24F 11/00* (2018.01)
*G05B 13/02* (2006.01)
(Continued)

(52) U.S. Cl.
CPC .............. *F24F 11/64* (2018.01); *F24F 11/49* (2018.01); *F24F 11/74* (2018.01); *G05B 13/024* (2013.01);
(Continued)

(58) Field of Classification Search
CPC ............. F24F 11/49; F24F 11/64; F24F 11/74
See application file for complete search history.

(56) References Cited

U.S. PATENT DOCUMENTS

| 5,813,430 A | 9/1998 | De Leon |
| 2006/0074525 A1 | 4/2006 | Close et al. |

(Continued)

FOREIGN PATENT DOCUMENTS

| CA | 2736826 A1 | 10/2012 |
| GB | 856219 A | 12/1960 |
| GB | 2530772 A | 4/2016 |

OTHER PUBLICATIONS

Finnish Patent and Registration Office, Search report of FI20175706, dated Feb. 9, 2018, 2 pages.
(Continued)

*Primary Examiner* — Mark A Connolly
(74) *Attorney, Agent, or Firm* — Thomas |Horstemeyer, LLP (57) ABSTRACT

An arrangement and method for determining adjustment parameters for at least two components utilized in an HVAC system. The arrangement comprises at least one processor and is configured to receive information regarding a duct configuration comprising at least one duct. The processor is additionally configured to receive target values for a first flow parameter at first and second duct locations corresponding to locations of the first and second components. At least one measured value for a second flow parameter at a measuring location is received, and determined values for the second flow parameter at the first and second duct locations are resolved. First and second flow factors are determined, and first and second adjustment parameters may then be determined for the first and second components.

20 Claims, 6 Drawing Sheets

(51) Int. Cl.
*F24F 11/64* (2018.01)
*F24F 11/74* (2018.01)
*F24F 11/49* (2018.01)
*F24F 110/20* (2018.01)
*F24F 110/50* (2018.01)
*F24F 110/10* (2018.01)

(52) U.S. Cl.
CPC ....... *F24F 2110/10* (2018.01); *F24F 2110/20* (2018.01); *F24F 2110/50* (2018.01)

(56) References Cited

U.S. PATENT DOCUMENTS

| | | |
|---|---|---|
| 2007/0205297 A1 | 9/2007 | Finkam et al. |
| 2008/0012310 A1 | 1/2008 | Weaver et al. |
| 2012/0100797 A1* | 4/2012 | Vogel ...................... F24F 11/74 454/239 |
| 2012/0108159 A1 | 5/2012 | Votaw et al. |
| 2012/0323376 A1 | 12/2012 | Honda et al. |
| 2014/0078499 A1 | 3/2014 | Tunheim et al. |

OTHER PUBLICATIONS

Finnish Patent and Registration Office, Search report of FI20185660, dated Feb. 1, 2019, 1 page.
Finnish Patent and Registration Office, Search report of FI20195005, dated Jun. 20, 2019, 1 page.

* cited by examiner

ARRANGEMENT AND METHOD FOR DETERMINATION OF ADJUSTMENT PARAMETERS OF AN HVAC SYSTEM

PRIORITY

This application is a U.S. national application of the international application number PCT/FI2018/050560 filed on Jul. 27, 2018, which claims priority of Finnish application FI20175706 filed on Jul. 31, 2017 and FI20185660 filed on Jul. 27, 2018, the contents of all of which are incorporated herein by reference.

TECHNICAL FIELD OF THE INVENTION

The invention is related to heating, ventilation, and air conditioning (HVAC) systems in general. More specifically, the invention is related to an arrangement and method for receiving information regarding a duct configuration and determination of adjustment parameters for components such as dampers and valves utilized in an HVAC system.

BACKGROUND OF THE INVENTION

Most buildings usually incorporate some form of HVAC system involving ducts that requires maintenance and adjustment. The ducts should be cleaned and flows and/or pressures within the ducts should be monitored and adjusted regularly in order to ensure that the system is operating as intended.

The current means for testing, adjusting, and balancing (TAB) of HVAC systems are slow and expensive. Performing TAB involves placement of sensors at different locations in the HVAC system and using measurements of the sensors to determine if adjustments should be made to components of the HVAC system such as dampers, valves, fans, or pumps in order to maintain the system in a desired state. The desired state may, for example involve target flow parameter values, such as target pressures or volume flow rates at certain locations, assigned by a mechanical engineer involved in the design of the HVAC system. Usually the TAB process involves many stages as adjustments and analysis of sensor measurement values are repeatedly conducted until the desired state is achieved, making the process time-consuming and laborious.

Preliminary adjustments of the components may be calculated using floor plans (which indicate configurations of ducts), target values for flow parameters in certain locations of the ducts, and information regarding components. Locations of components should be specified, along with information relating to component adjustments and flow parameters. For example, in the case of a valve, the information may specify an amount of fluid that may pass through the valve at a certain adjustment (i.e. at a certain state of openness).

A TAB technician typically makes preliminary adjustments of components in a duct and then performs measurement of flow parameters through sensors that are placed in the duct, after which adjustments may have to be updated if it is determined through measurements made by the sensors that the flow parameters are not at target values. The technician may have to perform many rounds of adjustment and measurement, and travel along a duct configuration many times in order to read sensor measurements giving flow parameters and to perform the adjustments and once again inspect sensor measurement readings after performing changes to the adjustments of components.

A further difficulty that is often faced while conducting TAB of HVAC systems is that the floor plans of HVAC systems of a building do not often match the actual layout of the system. The plans may have changed without updating of the documents or deviation from the plans may have occurred during construction. The HVAC system parameters, such as adjustment parameters of components, may be determined according to the erroneous floor plans, leading to errors and difficulties in maintenance. As preliminary adjustments of the components to be installed in an HVAC system are conventionally computed with respect to the floor plans, they may be substantially incorrect if floor plans are not up to date. Also, calculated adjustment parameters cannot take into account e.g. leaks in the duct configuration.

While performing TAB on an HVAC system, components such as dampers may have to be installed after the duct configuration and HVAC system has already been designed and built. The ducts may, for instance, incorporate a fire prevention material, which might have to be removed in order to install a damper, in addition to possible dismantling of at least a portion of the duct configuration. This process may be strenuous, time-consuming, and lead to excessive material consumption.

In another aspect, reporting of the work done on HVAC systems to clients, including e.g. cleaning of the ducts, involves a separate work step that is error-prone and customers may have no way of confirming that the reported work was in fact carried out. Changes occurring in the HVAC system may also not be detected, which may lead to monetary losses for example in the case of leaks, as well as health hazards related to mold formation, for instance.

SUMMARY OF THE INVENTION

An object of the invention is to alleviate at least some of the problems relating to the known prior art. Especially the object of the invention is to provide an arrangement for determining adjustment parameters for at least two components of an HVAC system comprising at least one duct, wherein the arrangement comprises at least one processor that is configured to receive information regarding dimensions and/or layout of said at least one duct of the HVAC system and receive a first target value for at least one first flow parameter in a first duct location corresponding to the location of a first component comprised in the HVAC system. The processor is additionally configured to receive at least a first measured value for at least one second flow parameter in at least one first measuring location of the duct and receive location information regarding the at least two components, wherein the location information is indicative of at least a relative location of the at least two components and their location with respect to the at least one duct. Further, the processor is configured to resolve a first determined value for the second flow parameter in the first duct location utilizing the received first measured value for a second flow parameter and the received location information and then determine a first flow factor for the first component utilizing the received first target value for the first flow parameter in the first duct location and the first determined value for the second flow parameter in the first duct location, after which the processor may determine a first adjustment parameter for the first component through the first determined flow factor. The processor may be configured to additionally receive a second target value for at least one first flow parameter in a second duct location corresponding to the location of a second component comprised in the HVAC system and resolve a second determined value for the second flow parameter in the second duct location utilizing the received first measured value for the second flow parameter and the received location information. In addition, the processor may be configured to determine a second flow factor for the second component utilizing the received second target value for the first flow parameter in the second duct location and the second determined value for the second flow parameter in the second duct location, after which it may determine a second adjustment parameter for the second component through the determined second flow factor for the second component In another aspect, there is provided a corresponding method according to claim 19 and a computer program according to claim 20.

In advantageous embodiments, the arrangement is configured to receive information regarding the layout and/or dimensions of a duct configuration. The layout may refer to turns, bends, and/or junctions in the duct configuration. Dimensions may refer to a shape, diameter, and/or length.

In an embodiment, the information on the duct system is obtained through an information gathering device. The device may be configured to maneuver in a duct. The maneuvering may be actuated by a user of the arrangement, e.g. by the user pushing the device through the duct, or the device may be configured to move automatically or through utilizing e.g. an electric motor.

In one embodiment, an information gathering device may be configured to be attached to an external device, wherein the external device is configured to maneuver inside said at least one duct.

In one aspect, an information gathering device may be used solely for the purpose of obtaining information regarding the layout and/or dimensions of a duct configuration. The information may be stored, reported, or provided in a computer-readable format. This may be provided and useful for e.g. TAB technicians and/or their clients.

An information gathering device may in an embodiment be used to generate a report that may be indicative of the parts of a duct configuration that have been cleaned.

In one embodiment, an arrangement comprising at least one processor is provided that utilizes the information gathered by an information gathering device to provide the information obtained by an information gathering device to a user of the arrangement.

In an embodiment, an information gathering device may comprise a flexible conduit and the device is configured to maneuver inside said at least one duct via manipulation of the flexible conduit or the device may be configured to be attached to an external device and the external device may comprise a cable and the device may then be adapted to maneuver inside said at least one duct via manipulation of the cable. The information received regarding a duct configuration, especially in the case that it is received through an information gathering device, may differ from the information given in the floor plans of a building, ensuring that the TAB process may be conducted properly taking into account the actual configuration of the duct or ducts, and time is not lost due to this issue.

The information gathering device may gather information through one or more sensors, the sensors being configured to obtain information regarding the duct configuration that is to be received by the arrangement.

In embodiments of the invention, the one or more sensors comprised in an information gathering device may be selected from the group of a deflection sensor which may be a flex sensor, a laser scanner, a camera, an accelerometer, a gyroscope, a barcode scanner, an RFID scanner, or an infrared sensor.

The information gathering device (or external device that the information gathering device may be configured to be attached to) may in advantageous embodiments comprise means for cleaning a duct, such as one or more brushes, or be adapted to enable cleaning of a duct through coupling with an external device, such as an external device comprising a brush, and be utilized prior to the TAB process to firstly clean the duct or ducts, while simultaneously measuring the dimensions and/or layout of the one or more ducts.

In some embodiments, the information gathering device may obtain location information regarding one or more components and this information may then be received by the processor. Location information may be obtained as a separate process or simultaneously to cleaning and/or gathering of information regarding the duct.

The flow parameters may refer e.g. to pressures or fluid volume flow rates. For example, the first flow parameter for which target values are received may be air volume flow rate and the second flow parameter for which a measured value is received may be pressure.

In an embodiment of the present invention, an arrangement may receive an HVAC plan comprising information that may e.g. be determined by a designer of the HVAC system. This information may comprise information regarding a planned or intended layout of a duct configuration, planned locations of one or more components, the type of the one or more components, and/or one or more target values of flow parameters. An HVAC plan may for instance be received as a DWG file.

The components utilized in the HVAC system may comprise e.g. valves and/or dampers. A flow factor may be a factor that describes the relationship between the pressure drop across a component and the corresponding flow rate. Adjustment parameters may refer to e.g. adjustments of positions into which components such as valves or dampers are set, i.e., how "open" they are. A certain adjustment may correspond to a value for a flow factor. Flow factors may be available for different adjustments of a component and for different components.

In some embodiments, an information gathering device may obtain identification information regarding a component. If the information gathering device maneuvers in the duct, the device may comprise sensors or other means for detection of a component and the arrangement may be configured to identify the component.

Using a received measured value for a flow parameter in a measuring location of the duct, the arrangement may resolve a determined value for the flow parameter in another duct location. This may be done utilizing flow parameter data regarding the second flow parameter that may indicate how the second flow parameter changes while traversing through a duct with certain dimensions and/or layout. In some embodiments the flow parameter data is also obtained by the processor.

A measured value may be received through a sensor located in the duct. In an advantageous embodiment, the sensor may wirelessly communicate information, comprising at least measured values, to the processor.

Adjustment parameters for the components may be determined through the determined flow factors and adjustment data that may in an embodiment be obtained by an arrangement. The adjustment data may comprise data relating a flow factor to an adjustment parameter.

The arrangement may be used for TAB of an HVAC system for a particular duct configuration. This provides an advantage over the known prior art, as adjustment parameters for components in an HVAC system may be determined according to the actual duct configuration instead of possibly inaccurate floor plans.

In some embodiments, the processor may receive a plurality of measured values for a flow parameter. For example, a measured value for the second flow parameter in a duct location corresponding to a component may in an embodiment be received by the arrangement. Using the measured values, an arrangement may resolve one or more updated determined values for at least one flow parameter in one or more duct locations. Then, the arrangement may determine updated adjustment parameters for one or more components.

If adjustment parameters are determined using a first measured value for a second flow parameter at a first measuring location which is not a duct location corresponding to a component, a second measured value may be obtained at a second measuring location, wherein the second measuring location corresponds to the location of a component, e.g. the first duct location corresponding to the location of a first component. The second measured value for the second flow parameter may indicate that the first determined value for the second flow parameter at the first duct location is not achieved in reality, e.g. due to a leak. The arrangement may then determine an updated first flow factor and an updated first adjustment parameter for the first component. Then, an updated second determined value for the second flow parameter at the second duct location (the location of the second component) may be resolved, and accordingly, an updated second flow factor and an updated second adjustment parameter may be determined for the second component.

In embodiments where the arrangement is utilized to determine adjustment parameters for more than two components, the procedures explained above may be used to resolve third, fourth, etc. determined second flow parameters at third, fourth, etc. duct locations (corresponding to the locations of a third, fourth, etc. component) and third, fourth, etc. flow factors and adjustment parameters may be determined for the third, fourth, etc. components.

The arrangement may provide an output to a user indicative of at least one determined adjustment parameter. The output may be communicated to the user through a user interface on a user device. Advantageously, adjustment parameters are communicated to the user, such as a TAB technician, along with one or more measured values for one or more flow parameters.

In an exemplary use scenario, a first measured value for a second flow parameter in a first measuring location may be received, and using said first measured value, adjustment parameters may be determined for two or more components comprised in an HVAC system. A TAB technician may for example then adjust a first component according to the first determined adjustment parameter. He/she may then install a sensor at the first duct location corresponding to the location of the first component and thus receive a second measured value for the second flow parameter. The arrangement may then possibly determine an updated first adjustment parameter that is different from the first determined adjustment parameter. The updated first adjustment parameter may be determined through first determining an updated first flow factor based on the second measured value for the second flow parameter at the firs duct location. Second, third, etc. possible updated adjustment parameters may also be determined after the second measured value is received. The technician may then move to the second component location, perform the adjustment according to the second updated adjustment parameter and once again install a sensor at the second duct location, and receive a third measured value for a second flow parameter at the second duct location. As disclosed above, the third measured value may be used to determine new updated adjustment parameters for any of the components comprised in the HVAC system.

In embodiments of the invention, measured values may be taken at any measuring locations. Measuring locations may reside at component locations. Measured values may be received from all component locations or one or more component locations or measuring locations that do not correspond to component locations.

In some embodiments, sensors may be readily installed in selected measuring locations.

Utilizing the arrangement, a TAB technician may not have to perform adjustment of components through trial and error. Traveling back and forth along a duct to detect sensor readings may not be required, as the arrangement may inform a user of real-time flow parameters in locations where sensors are placed. The arrangement may also indicate if a certain component's adjustment should be updated, and after a technician has performed the change in adjustment, he/she may observe through the user interface the resulting change in flow parameters measured by the sensors.

In an embodiment, a component comprised in the arrangement may be a protractible damper, where the damper is adapted to be easily incorporated with a duct. Dismantling of the duct is advantageously not required, saving time and amount of necessary labor, in addition to possible material reductions that may be induced. Removing a protractible damper which is adapted to be easily incorporated with a duct is also conducted with ease.

In addition, the time required to conduct a TAB process may be substantially reduced through the arrangement, because possibly erroneous floor plans are not utilized to make preliminary adjustments. A technician also does not have to perform many rounds of adjustments and analysis of outputs of sensors.

In some embodiments, the arrangement may conduct adjustments of the components automatically, which may reduce time and costs of maintenance of HVAC systems.

In addition to aiding in TAB processes, an arrangement may continually monitor the state of an HVAC system and conduct procedures in particular circumstances. The circumstances may for instance involve changes in the measurements made by a sensor. In some embodiments, a sensor may be configured to detect changes that may be indicative of mold. Sensor readings, or measured values, may also e.g. be indicative of a leak in the system. The procedures to be conducted may include alerting a user entity of the arrangement in some way. In some embodiments, the procedures may include giving instructions to a user entity. Abnormalities in system behaviour and other issues including possible mold may be taken care of more efficiently than using the current methods.

An arrangement may record all the procedures that have been carried out during a possible TAB process or HVAC design process that may involve cleaning of ducts. This information may be made readily available to a possible client, which omits the work step of reporting conducted work and also provides a work report which may be trusted by a client.

In an exemplary embodiment, if cleaning is performed via an information gathering device, a client may view through a possibly provided user interface which ducts have in fact been cleaned, and does not have to rely on information received from a source such as a contractor that has performed the cleaning. The cleaning process, as well as any other part of the TAB process may in an embodiment be observed essentially in real time through a user interface, facilitating also swifter and more accessible communication between e.g. a client and a TAB contractor as compared to conventional means such email or telephone. The need for separate reporting to a client may be eliminated. In embodiments where the information gathering device comprises a camera, footage of the duct may be captured. This footage may also be used to verify that cleaning has been performed and the performance of the cleaning may also be evaluated.

Information concerning a duct configuration may also be automatically saved to a CAD-program, which may eliminate a need for redrawing floor plans. Modified plans may be available for printing immediately.

Future communication between a TAB contractor or company that has installed the arrangement or any instance that shall possibly execute cleaning, TAB, or other procedures related to the HVAC system and a client or owner of the HVAC system may be facilitated and improved through utilization of an embodiment of the present invention. In some embodiments, information regarding the HVAC system may be automatically reported to for instance the TAB contractor. The TAB contractor may then contact the client when needed or desired and suggest recommended procedures.

The arrangement may also be used to test an HVAC system. A user may adjust a component, such as a vent, and observe the effects on the HVAC system.

In another aspect, there may be provided an information gathering device that may be used solely for the purpose of obtaining information related to the duct, such as information related to dimensions and/or layout.

In an embodiment, the information obtained by an information gathering device is usable for generating a computer-readable object, such as a file, that is indicative of at least the layout of the at least one duct.

Information obtained by an information gathering device be used to provide an up-to-date/actual layout of a duct configuration involving the at least one duct. The layout may be provided in a computer-readable format such as a DWG file.

There may also in one embodiment be provided an arrangement comprising an information gathering device provided that is used solely for the purpose of obtaining information related to dimensions and/or layout of a duct configuration, where the arrangement comprises at least one processor that is configured to receive said information from the device and provide the information in a computer-readable format, which may be indicative of at least the layout of at least one duct. In one other embodiment, such an arrangement may be configured to alternatively or additionally obtain information regarding one or more components comprised inside said at least one duct and the at least one processor is configured to receive the information regarding the at least one component and determine the location of the at least one component inside the duct and/or identify the at least one component.

As was disclosed above, an information gathering device or an arrangement comprising such a device may be used to track and/or monitor cleaning work of one or more ducts. Cleaning work or other work may be reported for instance to a client. The client may then be more assured that the cleaning or other duct-related work has actually been carried out, as the maneuvering of the device in the duct configuration has been verified through the use of the sensors comprised therein, instead of in a case where a technician has only just reported that the duct has been cleaned.

The exemplary embodiments presented in this text are not to be interpreted to pose limitations to the applicability of the appended claims. The verb "to comprise" is used in this text as an open limitation that does not exclude the existence of unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific example embodiments when read in connection with the accompanying drawings.

The previously presented considerations concerning the various embodiments of the system may be flexibly applied to the embodiments of the method mutatis mutandis, and vice versa, as being appreciated by a skilled person.

BRIEF DESCRIPTION OF THE DRAWINGS

Next the invention will be described in greater detail with reference to exemplary embodiments in accordance with the accompanying drawings, in which.

DETAILED DESCRIPTION

Figure 1:
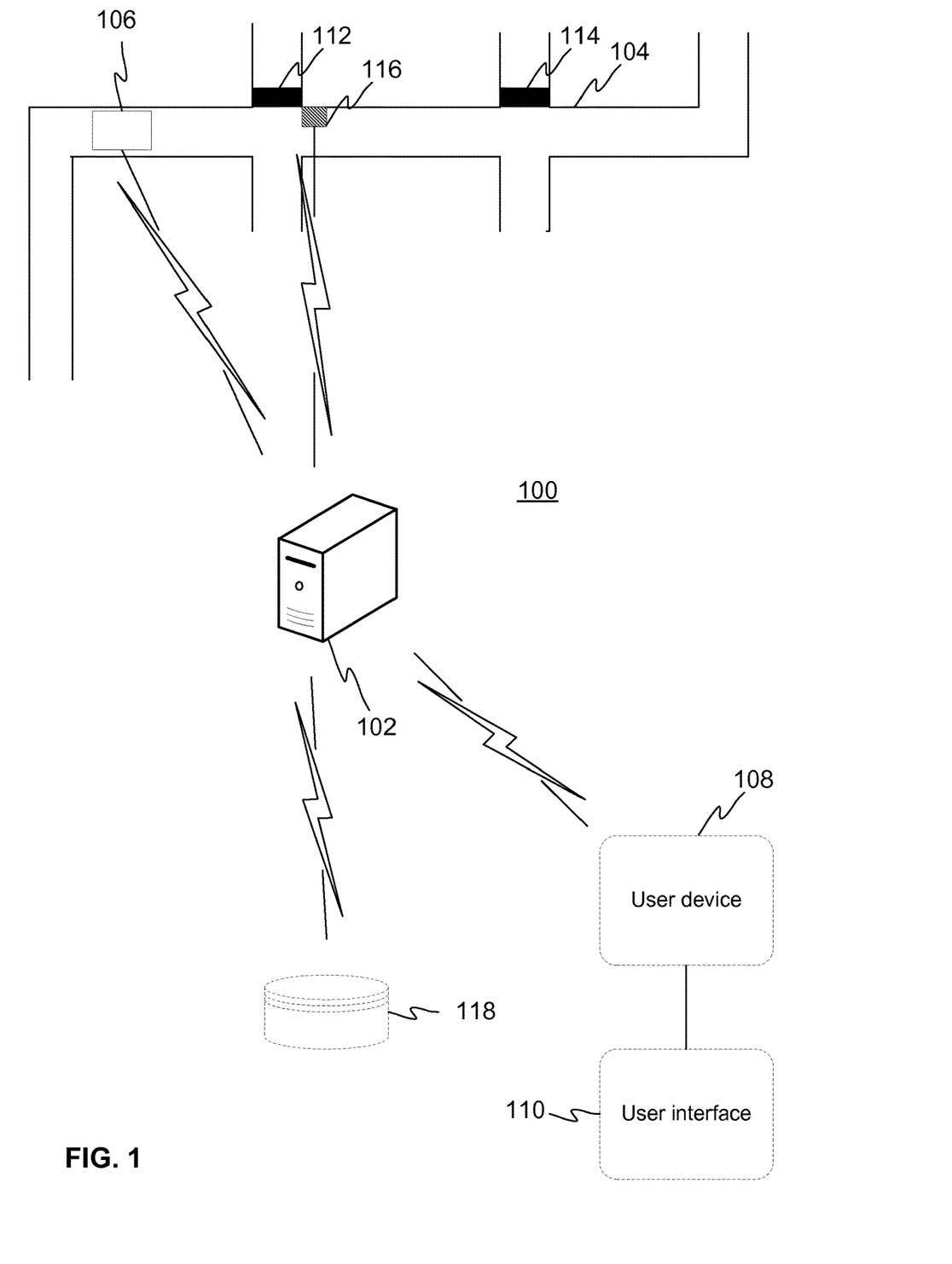
FIG. 1 illustrates an exemplary arrangement according to one embodiment of the invention.

FIG. 1 shows an exemplary arrangement 100 according to an embodiment of the invention. The arrangement 100 comprises at least one processor 102 configured to receive information regarding the layout and/or dimensions of at least one duct 104 comprised in an HVAC system.

In an embodiment, the information regarding layout and/or dimensions of the at least one duct 104 is obtained through an information gathering device 106.

In yet another embodiment, the information regarding layout and/or dimensions of the at least one duct 104 is obtained through an information gathering device 106, while an information gathering device 106 simultaneously cleans or enables cleaning of a duct 104.

The processor 102 also receives a first target value for at least one first flow parameter, such as a volume flow rate, at a first duct location corresponding to the location of a first component 112 comprised in the HVAC system. The aforementioned target value may in some embodiments be defined by a user of the arrangement 100, and may optionally be received through the use of a user device 108 comprising a user interface 110.

Target values for one or more flow parameters may also be received e.g. through a separate file such as a DWG file indicating planned characteristics of the HVAC system.

A first measured value for a second flow parameter, such as pressure, in a first measuring location is also received.

One or more measured values may be obtained through one or more sensors 116 located in a duct 104. A measured value may be communicated to the processor 102 through a user device 108 or in some embodiments a sensor 116 may automatically communicate a measured value to the processor 102 through wireless communication. In some embodiments, the measured values automatically communicated to the processor 102 may also be communicated to a user of the arrangement 100 through the user device 108.

Additionally, the processor 102 receives location information regarding at least two components 112, 114 that are utilized in the HVAC system. The location information is indicative of at least a relative location of the at least two components 112, 114 and their location with respect to the at least one duct 104. The location information may be received through the user device 108.

Location information may also be received through manual input by a user of the arrangement 100 or through a separate file such a DWG file.

Further, in some embodiments, location information regarding a component 112 may be received through the information gathering device 106. The information gathering device 106 may detect a component 112 and determine its location in the duct 104 e.g. through sensors. The location information may advantageously be obtained simultaneously to obtaining information regarding the layout and/or dimensions of the duct 104.

The location information may also in some embodiments be received through e.g. wireless communication between a component 112 and the processor 102. In this case, a component 112 may comprise means for position sensing.

In some embodiments, it may be possible that the intended use of e.g. a room comprised in the facility in which the HVAC system is comprised in is indicated, and the arrangement 100 has received or has access to target values for flow parameters such as air flow rates that should be pursued for different use scenarios. In this case a component 112, 114 such as a valve may be located at a location where a duct meets a room, and it may be indicated that the room is intended e.g. for office use. The available target value information may suggest that a certain air flow rate should enter an office room, and the air flow rate through the vent is then a target value for a flow parameter at the valve location.

In embodiments of an arrangement 100 where the arrangement 100 receives target values for flow parameters based on use purposes, it may also be possible for the arrangement 100 to correct target values obtained through e.g. HVAC plans if the plans are not accurate regarding the use of e.g. rooms. For instance if a room that is in the HVAC plans (possibly received through e.g. a DWG file) used as office space is currently used as meeting room space for which a target value for a flow parameter such as an air flow rate is different, the correct target value may be used by the arrangement 100 in determining adjustment parameters.

Through embodiments of the present invention, an arrangement 100 may also create, through e.g. the information gathered by an information gathering device 106 and/or data received via other methods such as through user inputs, an HVAC plan e.g. in the form of a DWG file. Erroneous DWG files may thus be replaced with updated, corrected ones.

Utilizing the received first measured value for a second flow parameter and the received location information, the processor 102 is configured to resolve a first determined value for a second flow parameter in the first duct location corresponding to the location of the first component 112. E.g., using a first measured value for a pressure at a first measuring location, a first determined value for a pressure at the first duct location, i.e., first component 112 location may be resolved.

If the first measuring location is the first duct location, i.e., the location of the first component 112, the first determined value for e.g. pressure is equivalent to the first measured value for pressure. If the first measuring location is not equivalent to the first duct location corresponding to the first component 112, the first determined value for the second flow factor such as pressure may be resolved otherwise, such as through calculations involving data related to the second flow parameter.

In an embodiment, the processor is configured to obtain flow parameter data which is related to the second flow parameter, wherein the flow parameter data comprises information on theoretical changes of the second flow parameter as a fluid traverses through a duct comprising certain dimensions and/or layout. The flow parameter data may be obtained through a user device 108 or the processor 102 may have access to said data for example through wired or wireless communication such as an internet connection. The flow parameter data may reside in a database 118. For example, the aforementioned data may indicate that pressure drops by 1 Pa/m when traveling through a straight duct with certain dimensions. If a measured value for a flow parameter indicates a certain pressure at a certain measuring location, the processor 102 may then resolve a determined value for the pressure at for instance the first duct location corresponding to the first component 112.

Using the first received target value for the first flow parameter in the first duct location corresponding to the first component 112 and the first determined value for the second flow parameter in the first duct location corresponding to the first component 112, the processor 102 may determine a first flow factor for the first component 112.

A flow factor K may in some embodiments be defined as $$K = \frac{Q}{\sqrt{\Delta P}}$$

where Q is a fluid volume flow rate (e.g. in l/s) through the component 112, 114 and $\Delta P$ is a pressure drop across the component 112, 114, i.e. a pressure value that may be measured at the component location.

The processor 102 may in an embodiment also be configured to obtain adjustment data regarding a component 112, 114. The adjustment data may be obtained through a user device 108 or the processor 102 may have access to said data for example through wired or wireless communication such as an internet connection. The adjustment data may reside in a database 118.

The adjustment data may for example comprise data that relates a certain adjustment setting or adjustment parameter of a component 112, 114 to a flow factor. That is, for a certain type of component 112, 114, the adjustment data may specify that a certain value for K corresponds to a certain adjustment setting, such as level of openness.

Adjustment data may be available for a plurality of component types and an HVAC system may comprise many different types of components 112, 114.

In an embodiment, an information gathering device 106 may also comprise means for obtaining identification data regarding a component 112, 114. The identification data may be utilized to select appropriate adjustment data to be used. The identification data may be obtained via one or more sensors, such as a camera, comprised in the information gathering device 106. Methods such as pattern recognition, RFID technology, short-range communication, or barcode technology may be utilized.

A component 112, 114 may comprise a transmitter that transmits the identification data, which the information gathering device 106 may be configured to receive, or the component 112, 114 and the information gathering device 106 may both comprise means for short range communication methods such as Bluetooth.

Using the determined first flow factor for the first component 112, the processor 102 may determine a first adjustment parameter for the first component 112. The adjustment parameter may indicate e.g. the openness of for instance a valve or a damper e.g. in percent. A number may also be used, and different types of indications, for example aforementioned numbers or percentages may be used for different types of components 112, 114.

The processor 102 also receives a second target value for at least one first flow parameter in a second duct location corresponding to the location of a second component 114 comprised in the HVAC system. Similarly to the aforementioned case regarding the first component 112, a second determined value for the second flow parameter in the second duct location corresponding to the location of the second component 114 is resolved utilizing the received first measured value for the second flow parameter and the received location information. A second flow factor may then be determined accordingly utilizing the received second target value for the first flow parameter in the second duct location and the second determined value for the second flow parameter in the second duct location. Through the second flow factor, a second adjustment parameter may then be determined for the second component 114.

Accordingly, adjustment parameters may be determined for any number of components 112, 114 comprised in an HVAC system.

The determined adjustment parameters may then be communicated to a user of the arrangement 100 through providing an output, possibly through a user device 108. An arrangement 100 may in some embodiments comprise a plurality of user devices 108 and a plurality of users. The determined adjustment parameters may be e.g. displayed to a user through the user device 108 comprising a user interface 110.

An arrangement 100 may also be configured to automatically perform adjustments of the components 112, 114 according to the determined adjustment parameters in one other exemplary embodiment, where the adjustment parameters are determined as explained above. In this case, the components 112, 114 may be digitally controlled and may, for instance, be adjusted by the processor 102 through wireless communication.

A processor 102 may additionally be configured to receive at least a second measured value for at least a second flow parameter in a second measuring location in a duct 104. The at least second measured value may be used to update the determined adjustment parameters.

In one embodiment, a second measured value for the second flow parameter in a second measuring location, which is the first or second duct location corresponding to the location of the first or second component 112, 114 is received. It may then be resolved that an updated determined second flow factor at the corresponding first or second location is equivalent to the second measured value. In a manner similar to that disclosed above, an updated flow factor may be determined for said first or second component 112, 114 utilizing the received first or second target value for the first flow parameter in the first or second duct location corresponding to the first or second component 112, 114 and the received second measured value for the second flow parameter in the first or second duct location. Through this, an updated first or second adjustment parameter for the first or second component 112, 114 may be determined. Using a procedure similar to that before, an updated first or second adjustment parameter may then be determined for the at least one other component 112, 114, whichever is the component that does not reside at the second measuring location.

It can be easily understood that adjustment parameters may be determined for any number of components 112, 114. Utilizing the received and possibly obtained information, one first measured flow parameter in a first measuring location may be used to determine adjustment parameters for any number of components 112, 114 comprised in an HVAC system that should result in received target values for second flow parameters. More measured flow parameters in other measuring locations may be utilized to determine that either determined values for second flow parameters are not achieved in reality or that target values for first flow parameters are not achieved, and an arrangement 100 may update the determined adjustment parameters accordingly.

Using measured values, the arrangement 100 may take into account an error situation such as a leak in the duct 104. In a leak situation, the determined adjustment parameters may not actually lead to the received target values for first flow parameters and/or the determined values for second flow parameters. The measured values may be of the second flow parameter and/or measured values may be received for the first flow parameter. Utilizing the measured values, updated adjustment parameters that may take a leak into account may be determined.

Advantageously, an arrangement 100 may comprise a plurality of sensors 116 through which measured values of one or more flow parameters may be received. Thus, as adjustments of components 112, 114 are performed, the actual effect on one or more flow parameters may be observed, and further adjustments may be made in order to achieve the received target values for a flow parameter.

The receiving of measured values of flow parameters through sensors 116 and/or determining of updated adjustment parameters and/or automatic performing of adjustments may be initiated by a user of the arrangement 100 or any of said actions may be carried out at predetermined time intervals or continuously.

In further embodiments, an arrangement 100 may also comprise other sensors, such as a mold sensor, a tvoc sensor (Total Volatile Organic Compounds), a voc sensor (Volatile Organic Compounds), a temperature sensor, a sound level sensor, a humidity sensor, or a dust sensor. These sensors, along with one or more sensors 116 for measuring flow factors, may be utilized to determine the occurrence of a disorder situation, which a user of the arrangement 100 may also be notified of through a user device 108. For example, a notification procedure may be initiated if a measurement made by a certain sensor exceeds a predetermined value or is outside of a predetermined range. The predetermined values or ranges may be e.g. set by a manufacturer of an arrangement 100, they may be obtained from a database, or they may be set through a user device 108 by a user of the arrangement 100.

A disorder situation may for instance be a leak, an odor nuisance, a sound nuisance, a temperature disorder, a smoke disorder, a humidity disorder, or a mold situation.

For instance, detection of a leak may be done through observing that a measured value for e.g. a pressure at a measuring location does not match a determined value for a pressure at that location, where the determined value has been resolved using a measured value for pressure at another measuring location.

An arrangement 100 may also be configured to store information regarding occurring disorder situations, solution procedures that have been performed as a response to the disorder situations, and the outcomes of the solution procedures. This way, an arrangement 100 may learn, based on the previous information, to suggest to a user of the arrangement 100 a solution procedure in a certain disorder situation that may have a favorable outcome in order to overcome the disorder situation.

Figure 2:
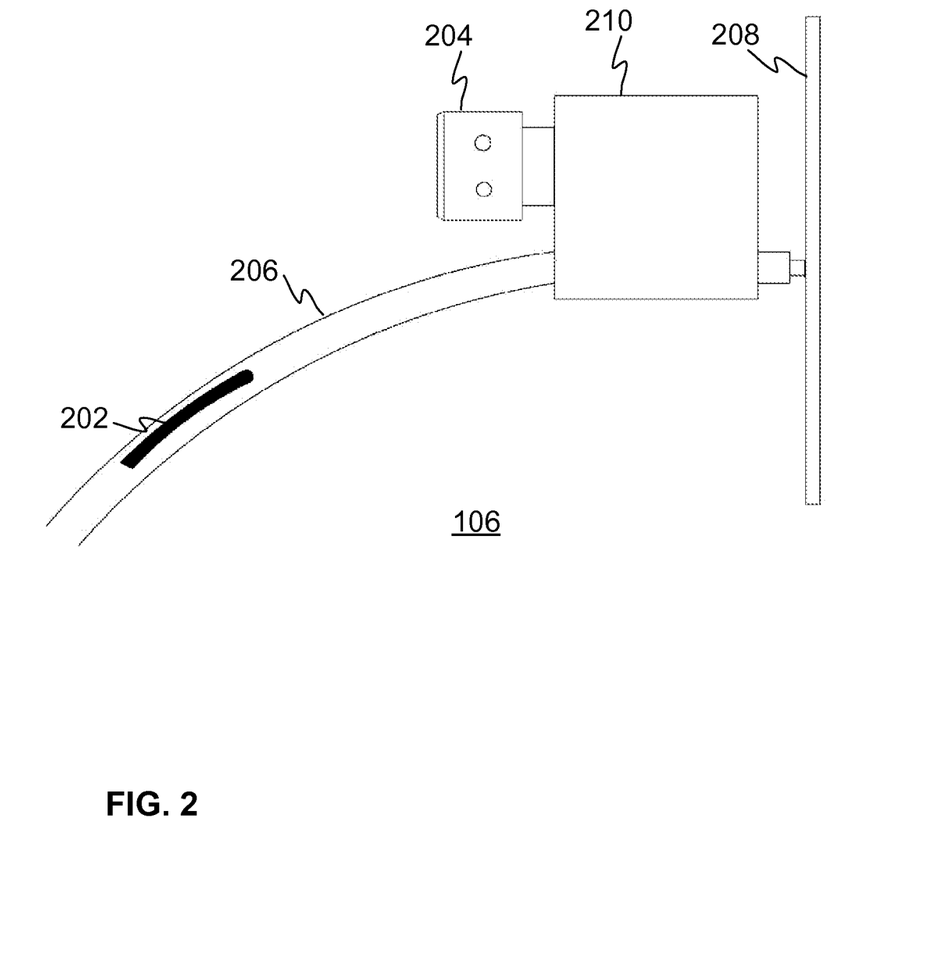
FIG. 2 shows an exemplary information gathering device according to one embodiment of the invention, FIG. 3 gives an exemplary protractible damper according to one embodiment of the invention.

FIG. 2 shows an exemplary information gathering device 106 according to an embodiment of the invention. In advantageous embodiments, the information gathering device 106 is configured to maneuver inside a duct 104 or it may be configured to be coupled to an external device that may move inside the duct 104 in order to obtain the information regarding the duct 104 and/or possibly the location information or identification data regarding a component 112.

The information on the size, shape, and directional changes in a duct 104 may be obtained through one or more sensors or other devices comprised in the information gathering device 106. In the embodiment of FIG. 2, a flex sensor 202 and a laser scanner 204 are utilized. E.g. other sensors that may be utilized include a gyroscope, accelerometer and/or a camera.

In FIG. 2, a flex sensor 202 is comprised in a flexible conduit 206 that may be used by a TAB technician or duct cleaner or other user of the information gathering device 106 to guide the device 106 inside a duct 104 e.g. by pushing. The flex sensor 202 may detect if a bend occurs in the duct 104 as the information gathering device 106 traverses through the duct. The direction and magnitude of e.g. a bend may be detected.

The information gathering device 106 may also comprise a laser scanner 204. The laser scanner 204 may analyze the duct 104 in order to collect data on the dimensions such as shape and/or diameter of the duct 104.

Information regarding the length of a duct 104 or certain portions thereof may for example be obtained through a flexible conduit 206 or the information gathering device 106 may comprise some other means for position determination through which distance/length information may be obtained.

The information gathering device 106 may advantageously in some embodiments also comprise means for cleaning of a duct 104. The device 106 may be used for cleaning or additionally (preferably simultaneously with the cleaning) or instead of the cleaning for obtaining information on the duct configuration. For instance, the device 106 may comprise a brush 208 that may e.g. remove dust from the walls of a duct 104 as the information gathering device 106 traverses therein.

Having regard to embodiments where the information gathering device 106 may obtain information regarding components 112, in addition to obtaining identification information through e.g. the methods mentioned above, the information gathering device 106 may obtain location information regarding a component 112, 114. This may be done by utilizing sensors comprised in the information gathering device 106 and position data that may also be acquired through sensors or e.g. by measuring at least one distance that the information gathering device 106 has traversed for instance through the flexible conduit 206.

In preferred embodiments, the information gathering device 106 may transmit the gathered information to the processor 102 through wireless communication.

In other embodiments, the information gathering device 106 may comprise other methods of maneuvering through a duct and be a robot or a drone and/or comprise other ways for gathering information, such as through infrared sensing.

The information gathering device 106 may be of any shape and may comprise a body portion 210 onto which sensors, cleaning means such as a brush 208, and/or maneuvering means such a flexible conduit 206 may be attached. Alternatively, sensors and means for maneuvering may be comprised inside a body portion 210. A body portion 210 may be comprised of a material such as metal or plastic.

In other embodiments, an information gathering device 106 may be configured to be coupled with an external device. In such embodiments, the external device may be configured to maneuver inside a duct 104 and may additionally comprise means for cleaning a duct, such as a brush, while the information gathering device 106 may comprise e.g. sensors for gathering information (as described elsewhere in this document) and coupling means such as one or more clips which may be utilized to couple the information gathering device 106 to the external device.

An arrangement 100 may be configured to communicate to a user of the arrangement 100 a current location of an information gathering device 106 and/or the path of travel of said device 106 in a duct configuration within some time interval. Also information, such as camera footage, obtained by the device 106 may optionally be communicated to a user. The communication may be performed through a user interface 110 of a user device 108.

Embodiments of the arrangement 100 may comprise a plurality of different user devices 108 with different user interfaces 110. For instance, one user device 108 may be a mobile handheld device intended to be used by a TAB technician, where the first user interface 110 is configured to show at least the determined adjustment parameters. The user interface 110 may, for instance, show a layout of a duct configuration along with the respective locations of components 112, 114, and may visually indicate a determined adjustment setting for one or more of the components 112, 114. The TAB technician may then perform the adjustments as indicated.

In embodiments where the arrangement 100 comprises sensors 116 from which measured flow parameters are obtained, a user device 108 may also indicate these measured values. If a measured value suggests that a target value for a flow parameter is not achieved, updated adjustment settings may be shown to e.g. a TAB technician. Also other information that is received, obtained, or determined by the arrangement 100 may be displayed or otherwise communicated to the user.

An arrangement 100 may additionally or alternatively comprise a user device 108 intended to be used by a property owner, property maintenance service, or client of a TAB-performing enterprise. This user device 108 may be a mobile device or some other computing device such a desktop computer comprising a user interface 110 which may display similar or other information than that which is relevant for a TAB technician, such as progress of duct cleaning work. A property owner may wish to monitor the HVAC system through the user interface 110, and also notifications of error situations and suggested solution procedures may be communicated through the user interface 110.

An arrangement 100 may also comprise a web interface through which information may be communicated to a user.

Figure 3:
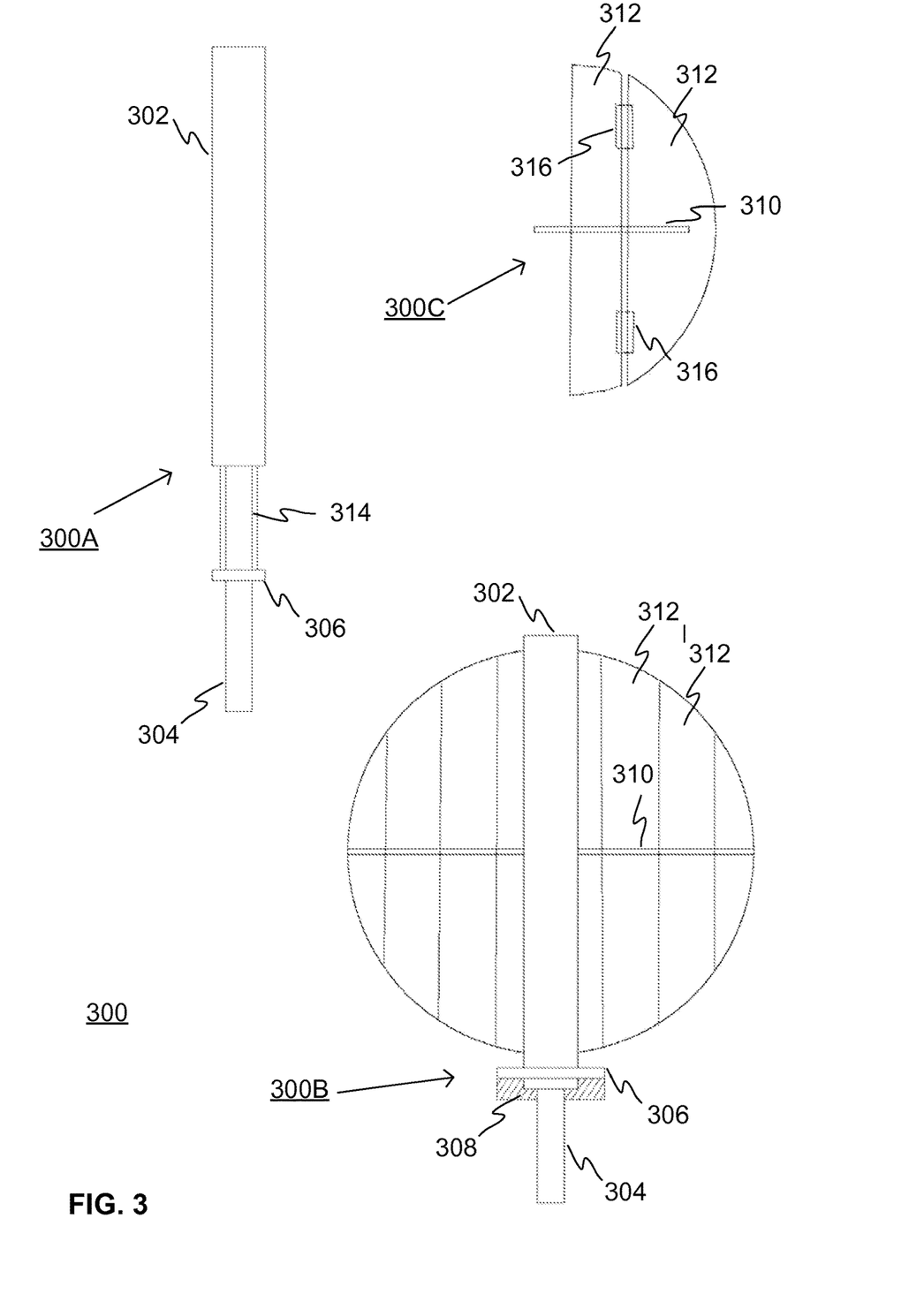

A component 112, 114 for which adjustments may be determined by an arrangement 100 may in an embodiment include a protractible damper. An exemplary protractible damper 300 is seen in FIG. 3. Advantageously, the damper 300 is adapted to be incorporated with a duct system through first drilling a hole into a duct 104 and inserting the damper 300 into the hole. Upon insertion, the protractible damper 300 is preferably in a first state, seen in 300A, where the protractible damper 300 is substantially rod-shaped and may approximately predominantly take the shape of a rod body 302. The rod body 302 may preferably be comprised of a rigid material, such as metal or plastic.

Once inserted, the protractible damper 300 may be configured to reside in the hole in the duct 104 so that a guiding element 304 may reside on the outside of the duct 104, or in other words, on the opposite side of the duct wall than the rod body 302.

A protractible damper 300 may in some embodiments also comprise a sealing element 306 that may seal the hole in the duct wall, i.e. act as a seal between the opposite sides of the duct wall at the location of the hole.

A protractible damper 300 may optionally additionally comprise a fixing panel 308, which may be located adjacent to the sealing element 306 in order to more effectively secure the protractible damper 300 to the duct 104. The protractible damper 300 may through the fixing plate 308 or through other securing means be secured to the duct 104, such as through use of nails, screws, or staples.

After insertion into a hole in a duct 104, the guiding element 304 may be manipulated to bring forth transformation of the protractible damper 300 from a first state to a second state, the second state being depicted in 300B. In the second state, the protractible damper 300 embodies a shape which comprises a surface area that is larger than that of the rod body 302. In Fig. 3, extension elements 312 are extended from the protractible damper and a plurality of extension elements 312 form a shape with a surface area that is essentially circular. The formed shape may be of another shape, but preferably the shape is substantially similar to the inner dimensions of the duct 104 that the protractible damper 300 is configured to be inserted into.

In the embodiment of FIG. 3, the aforementioned transformation is brought about by pushing on the guiding means 304. Said pushing will lead to extension of the extension elements 312 from the rod body 302 through extending means 310. The extending means 310 may be a wire or cable, possibly made of metal material, and the extension elements may be essentially flat elements that are configured to be extended by the attached extending means 310. The extension means 310 may extend from the rod body 302 by way of a rod extender portion 314, which may be visible in the first state and contained inside the rod body 302 in the second state.

An extension element 312 may be connected to one or more adjacent extension elements 312 (or a rod body 302 in the case of the innermost extension element 312) through one or more hinges or flexible joints 316, shown in 300C.

The extension elements 312 may be of any shape, but in the embodiment of FIG. 3, they are shaped so that when all of the extension elements 312 are in the fully extended state, i.e., when the protractible damper 300 is in a second state, the surface area formed by the extension elements 312 is essentially circular.

Extension elements 312 may comprise metal or plastic or some other solid material.

The protractible damper 300 may advantageously be readily transformed also from the second state to the first state. In an embodiment, this may be done by pulling on the guiding element 304. Pushing may lead to transformation from a first state to a second state, while pulling may lead to transformation from a second state to a first state.

After insertion, adjustment of a protractible damper 300 in the second state may be carried out by further manipulation of the guiding means 304. Rotation of the guiding means 304 may lead to a rotation of the rod body 302 and the attached extension elements 312. Thus, the position of the protractible damper 300 in the duct 104 may be adjusted and the amount of fluid being able to pass the protractible damper 300 per time unit may be controlled. That is, a desired adjustment setting of the protractible damper 300 is achieved through manipulation of the guiding means 304.

Removing of a protractible damper 300 from a duct 104 may be conveniently carried out by first removing possible securing means and then pulling of the guiding means 304 in order to ensure that the damper 300 is in a first state. The protractible damper 300 may then be removed from a duct 104 and a hole where the damper 300 has resided may be filled in a case where the damper 300 is to be removed e.g. permanently.

Figure 4:
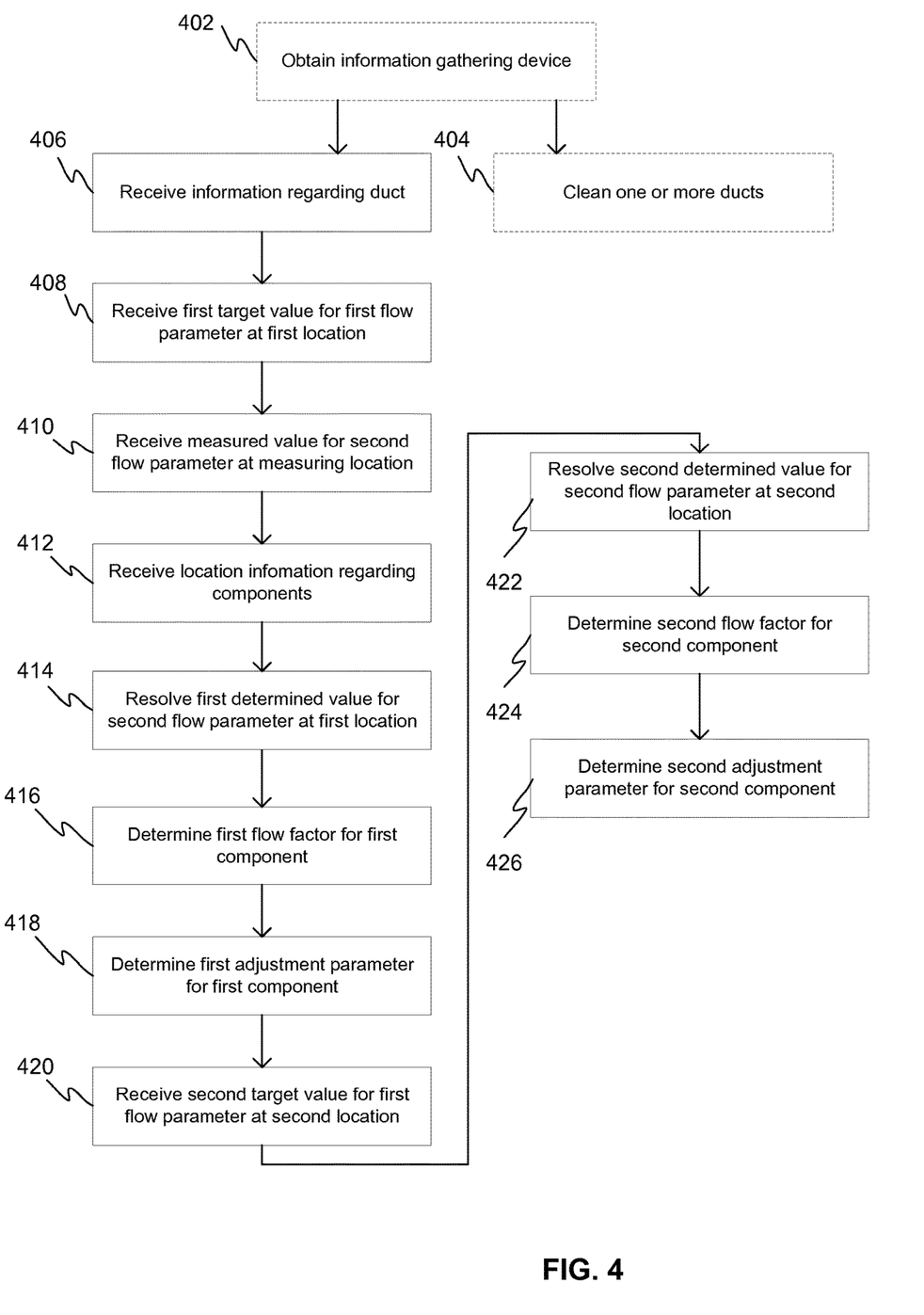
FIG. 4 shows the steps taken in a method according to an embodiment of the invention.

FIG. 4 shows steps that may be taken in a method according to the present invention. In some embodiments, an information gathering device 106 may be obtained at 402, and one or more ducts 104 comprised in an HVAC system may optionally be cleaned 404. Information regarding the dimensions and/or layout of the at least one duct 104 is received in 406.

In step 408, a first target value for at least one first flow parameter in a first location in the at least one duct 104 corresponding to the location of a first component 112 is received, while a first measured value for at least a second flow parameter in a first measuring location of the duct 104 is received in 410. Location information regarding at least two components 112, 114 comprised in the HVAC system is received 412, wherein the location information comprises at least information regarding a relative location of the at least two components 112, 114 and their location with respect to the at least one duct 104.

At 414, a determined value for the second flow parameter in the first duct location corresponding to the location of the first component 112 is resolved utilizing the received first measured value for a second flow parameter and the received location information. Then, in 416, a first flow factor may be determined for the first component 112 using the received first target value for the first flow parameter in the first duct location corresponding to the first component 112 and the first determined value for the second flow parameter in the first duct location. Through the determined first flow factor, a first adjustment parameter may be determined in 418 for the first component 112.

A second target value for the first flow parameter in the second duct location corresponding to the location of a second component 114 is received at 420, and, as for the first component 112, in 422, a determined value for the second flow parameter is resolved at the second duct location, and a second flow factor for may then be determined in 424, through which a second adjustment parameter may be determined in 426 for the second component 114.

In some embodiments a measured value may be received 410 any number of times and adjustment parameters may be accordingly determined any number of times.

Steps taken in a method according to the present invention may also be conducted in an order differing from that which is presented in FIG. 4. As can be easily understood, e.g. receiving of target values 408 and 420 may for example both happen simultaneously and possibly e.g. after step 410 of receiving a measured value.

Figure 5:
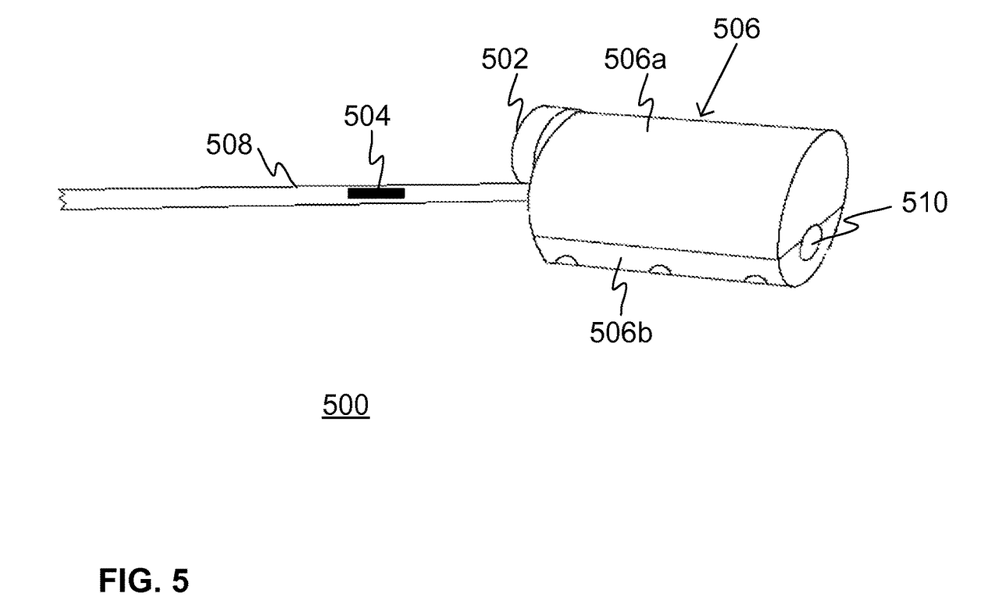
FIG. 5 illustrates one other embodiment of an exemplary information gathering device according to the invention.

Coming back to information gathering devices, FIG. 5 shows one other embodiment of an exemplary information gathering device 500. An information gathering device 106, 500 may in some embodiments be used solely for the purpose of obtaining information related to a duct such as layout information and/or location information regarding components. The device 500 comprises sensors that may be utilized to gather information regarding dimensions and/or layout of at least one duct comprised in an HVAC system. In the embodiment of FIG. 5, the device 500 comprises a laser scanner sensor 502 and a deflection sensor 504, which is a flex sensor. Other sensors that may be utilized are for instance a gyroscope, accelerometer, infrared sensor, and/or a camera.

In the embodiment of FIG. 5, the device 500 comprises a body portion 506. The body portion 506 may e.g. comprise metal or plastic and it may comprise the sensors of the device 500 or sensors may be attached/coupled thereto. The body portion 506 may also comprise other elements or part of the device 500, i.e., all parts of the device 500 may be comprised inside the body portion 506 or some or all of the parts may be attached thereto.

The device 500 may be configured to maneuver (or be maneuvered) inside the at least one duct of the HVAC system to obtain the information on its dimensions and layout or the device may be configured to be coupled with an external device that may be configured to maneuver or be maneuvered inside the at least one duct. The device 500 (or external device) may be configured to traverse through a duct without external force being exerted by a user of the device 500, utilizing e.g. an electric motor.

In other embodiments, the device 500 or external device and the device 500 that it is coupled to may be adapted to traverse through a duct by a user exerting force on the device 500. In FIG. 5, the device 500 comprises a flexible conduit 508 that may be used for maneuvering of the device 500. A user of the device 500 may for instance push the flexible conduit 508 so that the device 500 traverses through the duct. The flexible conduit 508 may be coupled to a body portion 506 of the device 500.

The deflection sensor 504 may be comprised inside the flexible conduit 508 or be coupled to the flexible conduit 508, e.g. a flex sensor 504 may be attached to the surface of the flexible conduit 508.

The flexible conduit 508 may within it or attached to it comprise e.g. electrical wires which may possibly be necessary for use with one or more sensors.

As the device 500 traverses through a duct, the laser scanner sensor 502 may gather information regarding the dimensions of the duct. As a skilled person will comprehend, a laser scanner sensor may detect e.g. the shape, diameter, height and/or with of the duct.

Yet, as the device 500 traverses through the duct, the flex sensor 504 may detect the direction and magnitude of bending of the flexible conduit 508 which may be used to determine the layout of a duct configuration through detection of the directional changes of the duct.

The distance that is traversed by the device 508 may for instance be determined through measurement of/by the flexible conduit 508, while this information may additionally be utilized to determine the layout, such as in lengths of different ducts or segments thereof, of the duct configuration, i.e., the one or more ducts comprised in an HVAC system. Also some other means for position determination through which distance/length information may be obtained may be comprised in the device 500, for instance a sensor comprised in the device may be configured to determine such information.

Layout of the one or more ducts may also be determined through sensors comprised in the device 500 that may be used to determine a position of the device 100 and/or the movement of the device 500. For instance, GPS sensors or accelerometers may be utilized.

Referring still to FIG. 5, the body portion 506 of the device 500 may comprise a first body portion 506a and a second body portion 506b. The first and second body portions 506a and 506b may be configured to be separated from each other or they may be configured to be partly separated from each other so that an external device or a part of an external device may be inserted into the device or coupled to the device so that a part of the external device may reside between the first and second body portions 506a and 506b, which will be show in the following figure. At least one opening 510 may be provided so that an external device may protrude from inside the body portion 506 of device. A similar opening 510 may be provided on the opposing face of the device which is not shown in the figure. The first and second body portions may for instance be configured to be attached to each other via pins or screws, or they may be configured to have interlocking elements to form a "snap-on"-type coupling.

In some embodiments, also a camera is comprised in the device 500. The camera may be used for obtaining photo and/or video material of the duct. The photo and/or video material may be viewed by a user of the device 500 to observe properties of the duct. The photo and/or video material may additionally or alternatively be utilized e.g. for identification purposes, so that the information obtained via the camera may be used to identify, for instance through pattern recognition, one or more components, such as dampers and/or vents that are comprised inside the duct. E.g. the type of a component may be identified, after which it may be possible to determine properties of the component, such as k-factors.

A device 500 may also be utilized for obtaining location information regarding one or more components comprised in the duct. The location information may e.g. indicate the location of a component with respect to the duct and/or the location of a component with respect to another component. As the layout of the duct is obtained, the location information may be determined therefrom, when a component is detected via a sensor.

In embodiments where components are identified, the identification may also be achieved through other means, such as barcode technology or RFID technology, with the device 500 comprising sensors for such identification means.

In one embodiment, the device 500 may be configured to maneuver inside the at least one duct and may comprise means for cleaning the at least one duct. For instance, a device in itself may comprise also a brush for cleaning the duct. The brush may e.g. be attached to the body portion 506.

Figure 6:
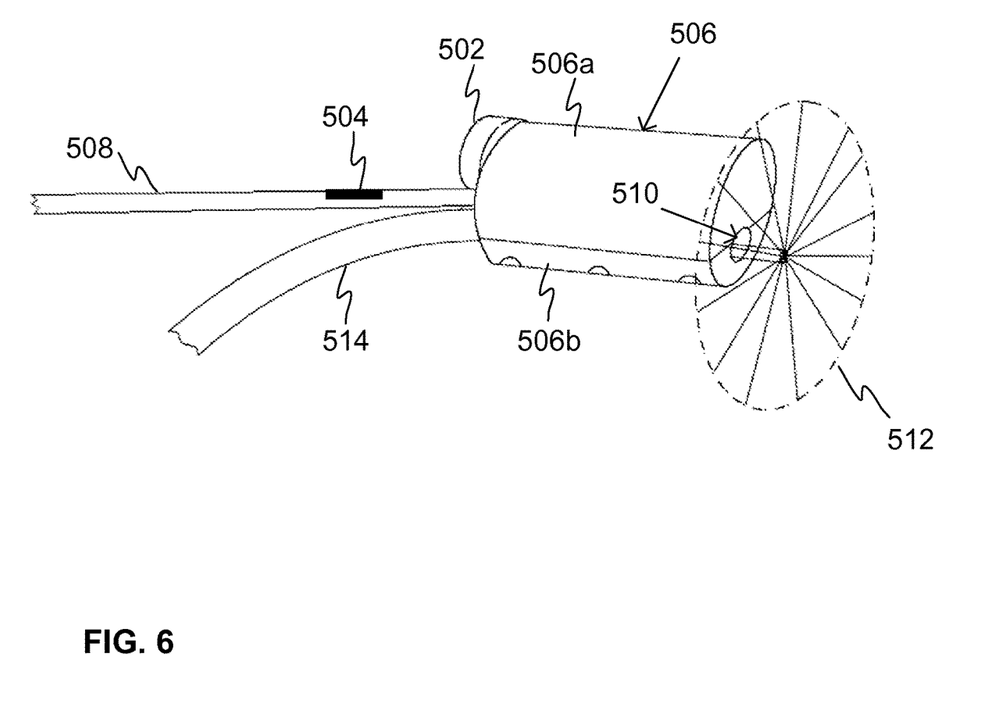
FIG. 6 shows another view of one other embodiment of an exemplary information gathering device according to the invention, and FIG. 7 gives one other embodiment of an exemplary arrangement according to the invention.

FIG. 6 shows an advantageous embodiment of an information gathering device 500 that is coupled to an external device. In this case, the device 500 may be similar to that of FIG. 5, while the external device comprises a brush 512 and a cable 514. The external device has been coupled to the device 500 so that the cable 514 is disposed between the first and second body portions 506a and 506b, and protrudes through the opening 510 (also on the other side of the body portion which is not visible in the figure).

An external device may comprise more parts than the brush 512 and the cable 514.

In the embodiment of FIG. 6, the device 500 may be configured to maneuver through a duct by a user of the device manipulating, e.g. by exerting a force, as explained also above, on the flexible conduit 508 or the cable 514.

The brush 512 may be used for cleaning of the duct. Thus, the device 500 may obtain the aforementioned information on the duct while simultaneously cleaning the duct. The brush 510 may e.g. remove dust from the walls of a duct as the device 500 traverses therein.

The coupling of an external device to a device 500 may be realized as in FIG. 6, but as will be appreciated by a skilled person, some other method of coupling may also be adopted. The external device may be coupled e.g. to a body portion 506 via for instance adhesive or other fastening means. E.g. a cable 514 may be attached to a body portion 506 utilizing hooks or the like.

In one embodiment, the length information of a duct may be obtained by measurement of the length of a cable 114 or a flexible conduit 108. Measuring means may be comprised in a device 100 or arranged in conjunction or to be coupled to a device 100 or an external device so that said length may be measured. E.g. through using one or more reels/cylinders through which the cable 114 or flexible conduit 108 may be passed or reeled while the device 100 traverses through a duct, one may obtain length information of the duct or one or more portions thereof.

The information that is obtained by the device 500 may be used to generate a file in computer readable or CAD format, such as a DWG file, that is indicative of the dimensions and/or layout of the duct configuration. This file may then be used as an updated floor plan for an HVAC system, as the original plans may have been erroneous. These up-to-date plans may then be subsequently used e.g. in TAB procedures, making them easier and faster, as e.g. preliminary adjustments of components are no longer done using the erroneous floor plans.

Figure 7:
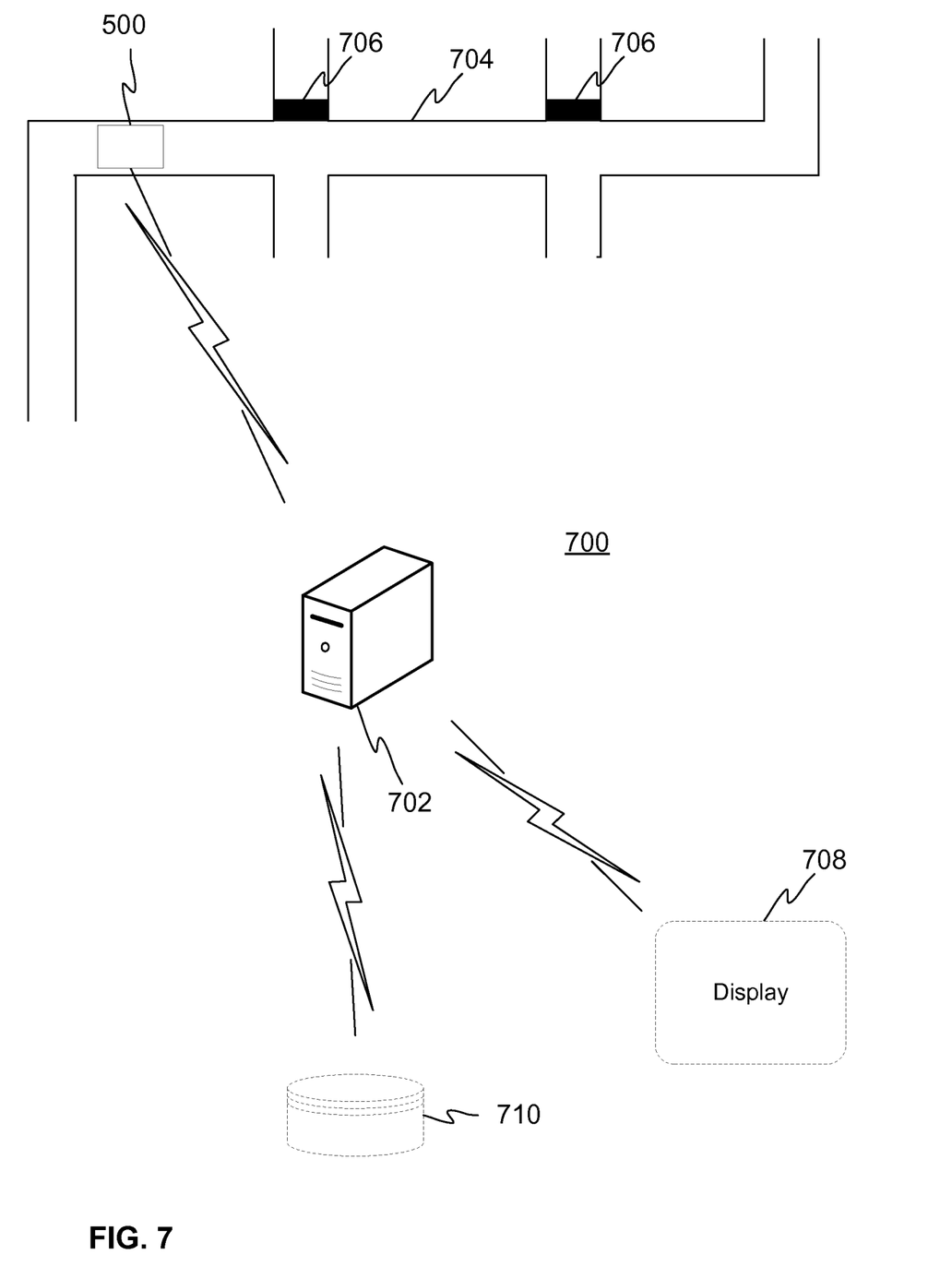

FIG. 7 gives an arrangement 700 according to one embodiment of the invention. The arrangement 700 comprises a device 106, 500 and at least one processor 702, that may be comprised in an electronic device. An arrangement 700 may be similar to that of the arrangement 100 but the arrangement 700 may be used in connection with an information gathering device 106, 500 for the purpose of obtaining information related to the at least one duct. In the arrangement 700 of FIG. 7, the device 500 is configured to maneuver inside at least one duct 704 of an HVAC system. The device 500 is configured to obtain information regarding the duct 704 as disclosed above. Information regarding one or more components 706 comprised in the duct 704 may also be obtained by the device 500. The at least one processor 702 is configured to receive the information obtained by the device 500.

The information may be received by the processor 702 in a wired or wireless manner. Wirelessly, the information may be sent via e.g. wireless internet, Bluetooth, or some other applicable wireless connection.

Some or all of the information received by the processor 702 may be received in a wired method. For instance, if the device 500 comprises a flexible conduit 508 comprising within it electrical wires coupled to the one or more sensors, the processor may also be wiredly coupled to e.g. such electrical wires, through which the information obtained by the device 500 may be received.

The processor 702 may be configured to provide the received information in a computer-readable format. For instance, the information provided in computer-readable format may be indicative of at least the layout of the at least one duct. The information may be provided, for instance, in DWG format. The layout determined through the information obtained by the device 500 and stored e.g. in a DWG file may then be used to replace a possibly erroneous DWG file concerning the duct configuration.

The arrangement 700 may also comprise at least one display 708. The display 708 may be used to view different data concerning the information obtained by the device 500. For instance, video footage taken by a possible camera of the device 500 may be viewed, the layout of the duct configuration may be viewed (e.g. the layout may be drawn on the display as the device 500 traverses inside the duct and obtains the information regarding the layout), and/or other data that may be determined through the information received from the device 500 may be viewed through the display 708.

In some embodiments, a display 708 may be comprised together with the processor 702 in the same electronic device. In other embodiments, an arrangement 700 may comprise a plurality of electronic devices, each or some of which comprising a respective display 708.

The processor 702 may have access to at least one database 710. The database 710 may be a remote database. The database 710 may be used to store any of the information that is received and/or produced by the arrangement 700 and additionally or alternatively, a database 710 may be used for obtaining information, e.g. as disclosed in the following.

In embodiments where the arrangement 700 obtains information regarding one or more components 706, the processor 702 may, using said information and additional information available via a database 710 and for instance measured or desired values for flow parameters, such as pressure and/or air volume flow rates, determine for instance adjustment parameters for the components 706. The additional information may e.g. be k-factors for certain components, which may relate the pressure drop over a component to an air volume flow rate.

The information obtained by a device 500 may also be received by an arrangement such as that disclosed with the arrangement 100 where e.g. adjustment parameters related to components may be determined and/or which may utilize up-to-date layout information regarding a duct configuration.

In one embodiment, the device 500 itself may comprise the processor 702 and be configured to provide the aforementioned information in computer-readable format, which may for instance be wirelessly sent to some other electronic device.

The information obtained by the device 500 may be used to automatically create a report or information that may be utilized to create a report to a client of a TAB technician that is indicative of portions of a duct configurations that have been cleaned with the device 500. An automatically generated report may also comprise other information that may be determined through the information obtained by the device 500.

The invention has been explained above with reference to the aforementioned embodiments, and several advantages of the invention have been demonstrated. It is clear that the invention is not only restricted to these embodiments, but comprises all possible embodiments within the spirit and scope of inventive thought and the following patent claims.

The features recited in dependent claims are mutually freely combinable unless otherwise explicitly stated.

The invention claimed is:

1. An arrangement for determining adjustment parameters for at least two components of an HVAC system comprising at least one duct, wherein the arrangement comprises at least one processor and is configured to
   receive information regarding dimensions and/or layout of said at least one duct of the HVAC system;
   receive a first target value for at least one first flow parameter in a first duct location corresponding to the location of a first component comprised in the HVAC system,
   receive at least a first measured value for at least one second flow parameter in at least one first measuring location of the duct;
   receive location information regarding the at least two components, wherein the location information is indicative of at least a relative location of the at least two components and their location with respect to the at least one duct;
   resolve a first determined value for the second flow parameter in the first duct location utilizing the received first measured value for a second flow parameter and the received location information;
   determine a first flow factor for the first component utilizing the received first target value for the first flow parameter in the first duct location and the first determined value for the second flow parameter in the first duct location;
   determine a first adjustment parameter for the first component through the first determined flow factor;
   receive a second target value for at least one first flow parameter in a second duct location corresponding to the location of a second component comprised in the HVAC system;
   resolve a second determined value for the second flow parameter in the second duct location utilizing the received first measured value for the second flow parameter and the received location information;
   determine a second flow factor for the second component utilizing the received second target value for the first flow parameter in the second duct location and the second determined value for the second flow parameter in the second duct location; and
   determine a second adjustment parameter for the second component through the determined second flow factor.

2. The arrangement of claim 1, wherein the processor is additionally configured to
   receive at least a second measured value for the second flow parameter in a second measuring location, wherein the second measuring location is the first or second duct location;
   determine an updated first or second flow factor for the first or second component, whichever resides at the second measuring location, utilizing the received first or second target value for the first flow parameter in the first or second duct location and the received second measured value;
   determine an updated first or second adjustment parameter for the first or second component through the determined updated first or second flow factor;
   resolve an updated first or second determined value for the second flow parameter in the first or second duct location, whichever is not the second measuring location, utilizing the received second measured value for the second flow parameter and the received location information;
   determine an updated first or second flow factor for the other component not residing in the second measuring location utilizing the received first or second target value for the first flow parameter in the first or second duct location and the updated determined value for the second flow parameter in the first or second duct location, whichever is not the second measuring location; and
   determine an updated first or second adjustment parameter for the other component through the determined updated first or second flow factor for the other component.

3. The arrangement of claim 1, wherein the information regarding dimensions and/or layout of said at least one duct is received through an information gathering device.

4. The arrangement of claim 3, wherein the information gathering device is configured to maneuver inside the at least one duct and wherein the information gathering device comprises means for cleaning the at least one duct and said device cleans the at least one duct simultaneously to obtaining said information regarding dimensions and/or layout of the at least one duct.

5. The arrangement of claim 3, wherein the information gathering device comprises at least one element selected from the group of a laser scanner, a flex sensor, a gyroscope, and a camera.

6. The arrangement of claim 3, wherein location information regarding at least one component is obtained through the information gathering device by measuring at least one distance that the information gathering device has traversed.

7. The arrangement of claim 3, wherein the information gathering device is configured to obtain identification data regarding the at least one component and the identification data of the component is used to retrieve said adjustment data of the component, wherein the identification data is obtained through a method selected from the group of pattern recognition, RFID technology, short-range communication, and barcode technology.

8. The arrangement of claims 1, wherein a measured value for a flow parameter in at least one location of at least one duct is received through a sensor located in the at least one duct, wherein the sensor is selected from the group of a pressure sensor, a mass flow rate sensor and an air velocity sensor.

9. The arrangement of claim 8, wherein the sensor is configured to wirelessly transmit data to the processor.

10. The arrangement of claims 1, wherein the arrangement is configured to provide an output to a user entity indicative of at least the determined adjustment parameters and the measured values.

11. The arrangement of claims 1, wherein the arrangement additionally comprises at least one sensor selected from the group of a mold sensor, a tvoc sensor, a dust sensor, a temperature sensor, a sound level sensor, a humidity sensor, and a voc sensor.

12. The arrangement of claims 1, wherein the processor is additionally configured to obtain adjustment data regarding the components, wherein the adjustment data comprises data relating a flow factor to an adjustment parameter.

13. The arrangement of claims 1, wherein the processor is additionally configured to obtain flow parameter data related to the second flow parameter, wherein the flow parameter data comprises information on theoretical changes of the second flow parameter as a fluid traverses through a duct comprising certain dimensions and/or layout.

14. The arrangement of claims 1, wherein the arrangement is additionally configured to automatically perform adjustment of at least one component according to the determined adjustment parameters.

15. The arrangement of claim 1, wherein the arrangement is additionally configured to notify a user of the arrangement of an occurring disorder situation, wherein said disorder situation is selected from the group of a leak, an odor nuisance, a sound nuisance, a temperature disorder, a smoke disorder, a humidity disorder, or a mold situation.

16. The arrangement of claims 1, wherein the arrangement is additionally configured to suggest, to a user of the arrangement, solutions in encountered disorder situations based on previously encountered disorder situations and solutions that have proven to be effective, where the disorder situation is detected by the arrangement or determined by a user of the arrangement.

17. The arrangement of claims 1, wherein the components are components selected from the group of a damper, a protractible damper, and a valve.

18. The arrangement of claim 17, wherein at least one component is a protractible damper and the protractible damper is substantially rod-shaped in a first state, and in a second state, extending means are extended from inside the rod shape, and extension elements attached thereto are also simultaneously extended from a rod body, the second state leading to the protractible damper embodying a shape of predetermined form.

19. A method for determining adjustment parameters for at least two components of an HVAC system comprising at least one duct, wherein the method comprises steps of
receiving information regarding dimensions and/or layout of said at least one duct of the HVAC system;
receiving a first target value for at least one first flow parameter in a first duct location corresponding to the location of a first component comprised in the HVAC system;
receiving at least a first measured value for at least one second flow parameter in at least one first measuring location of the duct;
receiving location information regarding the at least two components, wherein the location information is indicative of at least a relative location of the at least two components and their location with respect to the at least one duct;
resolving a first determined value for the second flow parameter in the first duct location utilizing the received first measured value for a second flow parameter and the received location information;
determining a first flow factor for the first component utilizing the received first target value for the first flow parameter in the first duct location and the first determined value for the second flow parameter in the first duct location;
determining a first adjustment parameter for the first component through the first determined flow factor;
receiving a second target value for at least one first flow parameter in a second duct location corresponding to the location of a second component comprised in the HVAC system;
resolving a second determined value for the second flow parameter in the second duct location utilizing the received first measured value for the second flow parameter and the received location information;
determining a second flow factor for the second component utilizing the received second target value for the first flow parameter in the second duct location and the second determined value for the second flow parameter in the second duct location; and
determining a second adjustment parameter for the second component through the determined second flow factor.

20. A computer program comprising program code means adapted to execute the method items according to claim 19 when the program is run on a computer.

* * * * *